W. L. BLISS.
LIGHTING SYSTEM.
APPLICATION FILED JUNE 8, 1904.
927,482.
Patented July 13, 1909.
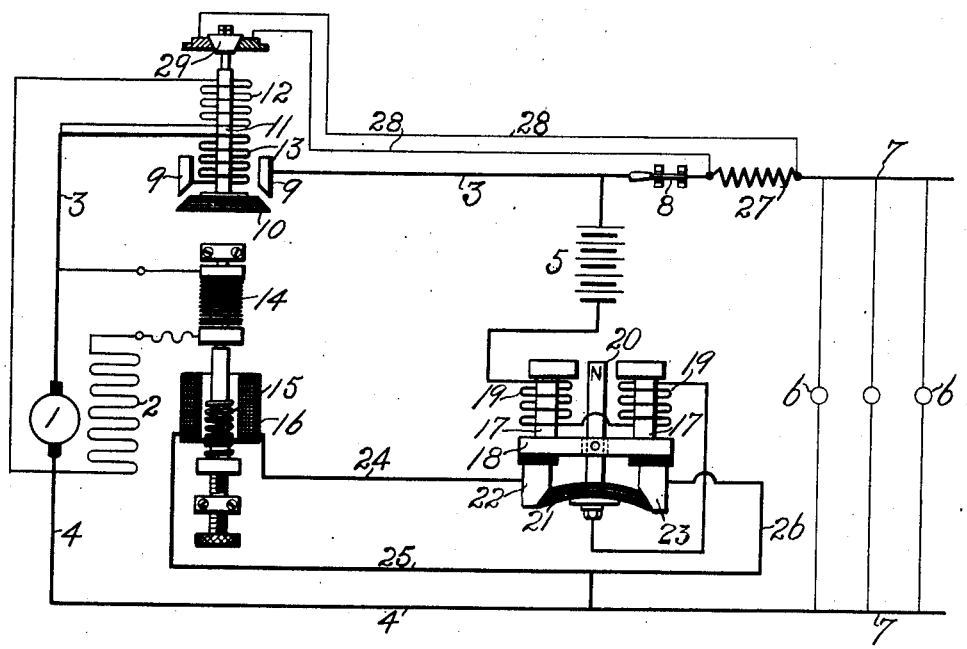
WITNESSES:
Herbert J. Smith
Edwin B. H. Tower, Jr.
INVENTOR.
William L. Bliss.
BY
Jones & Addington
ATTORNEYS.

UNITED STATES PATENT OFFICE.

WILLIAM L. BLISS, OF NEW YORK, N. Y.

LIGHTING SYSTEM.

No. 927,482.      Specification of Letters Patent.      Patented July 13, 1909.

Application filed June 8, 1904. Serial No. 211,599.

*To all whom it may concern:*

Be it known that I, WILLIAM L. BLISS, a citizen of the United States, residing at New York city, in the county of Kings and State of New York, have invented new and useful Improvements in Lighting Systems, of which the following is a full, clear, concise, and exact description, reference being had to the accompanying drawing, forming a part of this specification.

My invention relates to improvements in systems of electrical distribution. Although it is especially applicable to car and train lighting systems, it may be employed in other relations.

The present application claims a modified form of the invention set forth and claimed in my application filed June 22nd, 1904, Serial Number 213,680.

The form of my invention which is set forth herein is provided with a rheostatic regulator.

My invention is especially applicable to systems in which a generator furnishes current to operate lamps or other translating devices, and also to charge a storage battery, the storage battery being employed to furnish current to operate the lamps whenever the generator is inoperative.

The system is provided with a rheostatic regulator, which may be employed to regulate the generator, or to regulate the voltage impressed upon the translating devices, or for other purposes in the system. The operation of the regulator is controlled by means of an electro-magnetic winding which is preferably so arranged in circuit that its magnetism is proportional to the current the generator sends through the storage battery.

It will be understood that my invention in some of its phases comprehends a winding or any electroresponsive device which controls the rheostat in such a manner that its action is a function of the current the generator sends through the storage battery.

Furthermore, my invention comprehends an electromagnetic winding or any electroresponsive device which is so arranged that the rheostat which is controlled thereby tends to so regulate the generator that constant current for charging the battery is maintained at constant speed. The electro-magnetic winding may control the operation of the rheostatic device directly or through the agency of intermediary instrumentalities.

In accordance with my invention, I provide means to make the electro-magnetic winding independent of the electrical conditions when the battery and generator conjointly furnish current to operate the translating devices. These means may deënergize the winding or neutralize its effect in any way.

The accompanying drawing illustrates a system which will serve to explain my invention.

The generator is preferably provided with an armature 1 and shunt field winding 2. The armature may be driven by a car axle or any other means. The generator sends current through a main circuit 3, 4, to a storage battery 5, and lamps or other translating devices 6. The supply circuit is divided into two parallel branches, one the battery branch, in which the storage battery is arranged, and the other the translating branch, in which the translating devices are arranged. The translating or lamp circuit 7, 7, may be provided with a hand switch 8.

The main circuit is preferably controlled by an automatic switch which is provided with stationary contacts 9, 9, and a movable contact 10. The movable contact is preferably carried by a plunger 11, which is surrounded by a shunt winding 12 and a series winding 13. The shunt winding 12 is connected across the terminals of the armature of the generator. The series winding is connected in the main circuit in series with the switch contacts. When the generator is at rest, the automatic switch is open and consequently prevents the storage battery from discharging back through the generator. When the generator develops a voltage equal to that of the storage battery, the shunt winding attracts the plunger 11, thereby bringing the movable contact 10 into engagement with the stationary contacts 9, 9. The automatic switch is thus closed, thereby connecting the storage battery and the translating devices to the generator. So long as the automatic switch remains closed, the series winding 13 is energized and assists the shunt winding in keeping the movable contact firmly in engagement with the stationary contacts. When the generator voltage falls below that of the storage battery, current from the storage battery commences to flow backward through the main circuit. The series winding then opposes the shunt winding, due to the reversal of its polarity, and consequently the automatic switch opens. It will be understood that the automatic switch may assume various forms, and that other means may be employed to control the main circuit.

An automatic rheostat, the resistance of which may consist of a series of carbon disks or electrodes 14, is preferably employed to regulate the generator. The electrodes are preferably arranged in the shunt field circuit, and are normally pressed together by means of a spring 15. Of course, the rheostat may assume various forms and employ different kinds of resistance. While I have shown it as employed to regulate the generator, it is applicable to other uses in the system. The rheostat is controlled by an electro-magnetic winding 16. The winding may actuate the rheostat directly, it may control the action of intermediary instrumentalities which operate the rheostat or it may perform various other functions, so long as the result is that the resistance of the rheostat is controlled either mediately or immediately thereby. The winding may be a single coil, it may be a winding made in several parts, or it may be several coils so long as it accomplishes the result which is sought. Moreover, it may assume the form of any electro-responsive device, the action of which is a function of the current the generator sends through the storage battery. According to the form of rheostat which is shown in the drawing, the winding serves to vary the pressure between the electrodes, thereby causing a variation in the resistance in the field circuit.

The electro-magnetic winding may be connected in the battery circuit as illustrated in the drawing or it may be arranged in circuit any other way so long as it produces or tends to produce an equivalent result. If the winding be composed of two coils or parts which oppose each other, one coil being arranged in the main circuit and the other in the translating circuit, as illustrated in my application filed July 20th, 1904, Serial No. 217,385 its resultant magnetism would be the same as the magnetism of a single coil, arranged in the battery circuit, because the current the generator sends through the battery is equal to the total current in the main circuit, less the current in the translating circuit. In consequence, such a winding would produce the same result as a single coil arranged in the battery circuit.

In order to make the controlling winding 16 independent of the current discharged by the battery, or to neutralize its effect when the battery discharges, I may employ various instrumentalities. The drawing shows a polarized switch which is provided with two electro-magnets 17, 17, connected by a yoke 18. The electro-magnets are provided with windings 19, 19, which are preferably connected in the battery circuit. It will be noted that the polarity of the current in the battery circuit is subject to reversal. The current flows in one direction when the generator sends current through the battery and in the opposite direction when the battery discharges. In consequence, the polarity of the magnets 17, 17 of the polarized switch is subject to reversal. Between the magnets is arranged a polarized armature 20 which is preferably pivoted upon the yoke 18. The armature carries a flexible laminated brush 21, which normally bridges stationary contacts 22 and 23. When the generator sends current through the storage battery, the polarized armature 20 is drawn to the right, thereby removing the brush 21 from the contact 23, and pressing it against the contact 22. When the storage battery discharges, the polarized armature is drawn to the left, thereby removing the brush 21 from the contact 22 and pressing it against the contact 23. The electro-magnetic winding 16 is connected between the contact 22, and the main 4 by means of conductors 24 and 25. The contact 23 is connected to the main 4 by a conductor 26.

In order to charge the storage battery, the generator voltage must be raised above the normal voltage for the translating devices. I may provide various kinds of regulators to keep the voltage from becoming excessive in the translating circuit. I may employ a rheostatic regulator such as is used to regulate a generator or any other suitable means. The electro-magnetic winding which controls such regulator may be arranged in the battery circuit in the same manner as the electro-magnetic winding of the generator regulator. In order to simplify the illustration of my invention, I have shown a resistance 27 which may be considered to represent the resistance of a rheostat, or any other suitable form of regulator, the resistance is placed in the translating circuit in series, with the translating devices. Around the resistance extends a branch circuit 28, which is provided with a switch 29 mounted upon the plunger of the automatic switch. When the automatic switch is open, the switch 29 is closed, and then the resistance 27 is short circuited, thereby keeping it from holding down the voltage impressed upon the lamps by the storage battery. When the automatic switch is closed, the switch 29 is open, and then the resistance 27 prevents the generator from impressing an excessive voltage upon the translating devices.

As previously stated, my system may be used in various relations. I shall, however, describe its operation when it is used as an axle-driven car lighting system. When it is thus used, the generator will be driven intermittently at a variable speed. It may be assumed that the normal voltage of the storage battery is about sixty-four volts, and that about sixty-four volt lamps are employed. The automatic switch is therefore adapted to close when the generator develops about sixty-four volts.

When the car is at rest, the automatic switch is open and the battery furnishes the current to operate the lamps. The polarized switch then disconnects the electro-magnetic winding 16 from the battery circuit and connects the lamps directly to the storage battery. The windings 19 are energized by current discharged by the storage battery and consequently the armature 20 is drawn to the left so that the brush 21 is removed from engagement with the contact 22, and pressed against the contact 23. Current from the storage battery then flows from the positive terminal through hand switch 8, conductor 28, switch 29, conductor 28, conductor 7, lamps 6, conductor 7, conductor 26, contact 23, brush 21, and windings 19 to the negative terminal. When the car is set in motion, and reaches a speed of twenty miles an hour, the generator develops sixty-four volts. The automatic switch then closes and current from the generator flows from the positive terminal through series winding 13, switch contacts 9, 10, 9, main 3, switch 8, resistance 27, conductor 7, lamps 6, conductor 7 and main 4 to the negative terminal. While the generator voltage and the battery voltage remain substantially equal, the generator and the battery conjointly furnish the current to operate the lamps. When the generator voltage rises above that of the storage battery the battery stops discharging and the generator commences to send current through the same as well as through the lamps. The current flowing through the battery circuit will therefore be reversed. In consequence, the armature 20 of the polarized switch will be drawn to the right, thereby removing brush 21 from contact 23 and pressing it against contact 22. The polarized switch will thus connect the electromagnetic winding 16 in the battery circuit so that the said winding will be energized by the current the generator sends through the battery. When the current sent forth by the generator reaches the end of the conductor 3, it divides, one part flowing through the lamps and the other through the storage battery 5, windings 19, brush 21, contact 22, conductor 24, winding 16, and conductor 25 to the main 4. Inasmuch as the brush 21 normally engages both contacts 22, 23, it may be removed from engagement with one or the other of these contacts to shift connections of the circuits without disconnecting the battery from circuit.

It may be assumed that when the car runs at twenty miles an hour the armature 1 is driven at five hundred revolutions a minute, and develops sixty-four volts. The armature 1 will therefore be driven at fifteen hundred revolutions a minute when the car runs at sixty miles an hour. All other conditions remaining the same, the generator would develop about one hundred ninety-two volts. The voltage may be increased twenty-five per cent. above the normal voltage of the storage battery at maximum speed of the car, without being excessive, and such an increase will be sufficient to send the full charging current through the battery. The automatic rheostat so reduces the strength of the field 2 as the speed of the armature 1 increases that the voltage of the generator is confined within safe limits. The voltage of the generator however is permitted to rise sufficient to charge the battery. The current which the generator sends through the battery increases as the voltage of the generator increases. In consequence, the electro-magnetic winding 16 reduces the pressure between the electrodes 14 as the speed of the armature increases, thereby increasing the resistance in the circuit of the field winding 2. The generator is thus regulated so that the voltage thereof is confined within predetermined limits.

The current the generator sends through the storage battery increases substantially in proportion to the increase in the voltage, impressed at the battery terminals, above the normal voltage of the battery, throughout the greater portion of the period of charging the battery. It is only when the battery is very low or is nearly charged that the charging current does not vary as stated. Inasmuch as the winding 16 is arranged in the battery circuit it is subjected to a large variation in current upon a slight variation in the speed of the generator. In consequence the automatic rheostat is positive and stable in operation.

The winding 16 should be adapted to control the regulation of the generator so that the current which is sent through the battery will be of such a value that the battery will remain in such a condition that the current sent through the same will be in proportion to the rise in the voltage, impressed at its terminal, above its normal voltage.

Systems have been devised in which the controlling winding 16 is arranged in the main circuit. Under such conditions the regulation tends to keep the current to which the winding is subjected constant, and, consequently, the total current which the generator sends forth remains substantially constant at constant speed of the generator.

The current required in the translating circuit depends upon the number of lamps in operation. Accordingly the current taken by the lamp varies as the number of lamps in operation is changed. If the total current which the generator sends forth remains substantially constant, the current which is sent through the storage battery, will decrease when the number of lamps in operation is increased. The number of lamps in operation may be so great that the battery will receive very little current, and, in consequence, sufficient current may not be sent to the battery to restore the current which is taken therefrom. The battery may therefore become very low or exhausted, thereby making it necessary to charge it from time to time from an external source of electrical energy.

As previously stated, where the controlling winding is in the battery circuit, as in the drawing, it is independent of the variation in current caused by changes in the number of lamps in operation. Therefore, the current taken by the lamps may vary without affecting the action of the controlling winding. Inasmuch as the winding is arranged in the battery circuit, it causes constant current to be sent through the battery at constant speed of the generator, notwithstanding the variations in the current taken by the lamps. The winding may be adjusted so as to cause sufficient current to be sent through the battery to restore thereto all the current that may be taken therefrom.

Where my system is employed in lighting cars or trains, it is especially important to maintain constant current for charging the battery at constant speed of the generator, notwithstanding changes in the number of lamps in operation, as the current that is sent through the storage battery while the car is traveling, may be made sufficient to compensate for all the demands that may be made upon the battery, thereby preventing the battery from becoming exhausted or low, and avoiding the necessity of charging the battery from a stationary source supply. Moreover, it is important to maintain constant current for charging the storage battery so that the battery will be charged gradually and not be subjected to sudden rushes of current for short periods or charged at an excessive rate. While I have particularly described my system as employing an axle driven generator, it will be understood that the generator may be driven in other ways.

As previously stated, the polarity of the current in the battery circuit is subject to the reversal. If the controlling winding 16 were energized by the current discharged by the battery, or if it caused the rheostat to operate when the battery discharged, resistance would be inserted in the field circuit while the generator was operating at a low speed or was idle. If resistance were inserted in the field circuit, while the generator was running at a low speed, the generator voltage would be materially reduced. Moreover, if resistance were inserted in the field circuit while the generator was idle, the generator might not be able to excite itself. These difficulties are avoided by making the winding 16 independent of the current discharged by the battery. It will be understood that I may employ various means to attain the ends which are sought by my invention. The controlling winding may be deënergized, its effect may be neutralized or it may be prevented from controlling the rheostat. I have shown the polarized switch merely to explain one phase of my invention.

It has hitherto been proposed to provide the automatic switch with an auxiliary switch which will short circuit the winding 16 when the automatic switch opens, thereby rendering said winding independent of the current discharged by the storage battery. It will be noted that there is a period in the operation of the system when the storage battery discharges while the automatic switch remains closed. The auxiliary switch would not make the winding independent of the current discharged by the battery during this period and in consequence it would not attain the results which are produced by my invention.

It may be assumed that thirty-five amperes are required to operate the lamps. When the generator voltage and the battery voltage are substantially equal, the storage battery and the generator coöperate to furnish the current to operate the lamps. In order for the automatic switch to open, the battery must first furnish all the current for operating the lamps and then discharge current back through the series winding 13. The series winding may require four or five amperes to open the automatic switch. In consequence before the automatic switch opens, the battery may discharge thirty-nine or forty amperes. The polarized switch may be adapted to disconnect the winding 16 from the battery circuit when the storage battery discharges three or four amperes, and thus render the winding 16 independent of the current discharged by the battery throughout nearly the entire period, when the automatic switch is closed and the storage battery is discharging. Besides the variation of my invention which I have mentioned in particular, there are many others which will fall within the scope of the claims appended hereto.

Having thus described my invention, what I claim as new, and desire to secure by Letters Patent, is,

1. In a system of electrical distribution, a generator, a storage battery, translating devices connected to said generator and said storage battery, a rheostat arranged to regulate electrical conditions in said system, an electro-responsive device, connected in circuit to be subjected to electrical conditions in said system and arranged to control said rheostat, and means for rendering said electro-responsive device inert while said storage battery and said generator conjointly furnish the current to operate said translating devices.

2. In combination, a generator, a storage battery, translating devices, a main circuit extending from said generator and divided into two parallel branches, one the battery branch including the battery and the other the translating branch including the translating devices, an automatic rheostat having an electromagnetic winding for controlling the action thereof, said winding being arranged in circuit so that its magnetism is proportional to the current the generator sends through the storage battery, and means for rendering said winding inert when the generator and the storage battery conjointly furnish current to operate the translating devices.

3. In combination, a generator, a storage battery, translating devices, a main circuit extending from said generator and divided into two parallel branches, one the battery branch including the battery and the other the translating branch including the translating devices, a rheostat having an electro magnetic winding for controlling the action thereof, said winding being arranged in circuit so that its magnetism is a function of the current the generator sends through the storage battery, a switch for rendering said winding ineffective when the storage battery and generator conjointly furnish current to operate the translating devices, and an electro-magnetic winding for operating said switch and arranged in the battery branch.

4. In combination, a generator, a storage battery, translating devices, a main circuit extending from said generator and divided into two parallel branches, one including the storage battery and the other the translating devices, a rheostat having electro-magnetic winding for controlling the action thereof, said winding being arranged in the battery branch, and means for making said winding independent of the current discharged by the battery when the battery and the generator conjointly furnish current to operate the translating devices.

5. In combination, a generator, a storage battery, translating devices, a main circuit extending from said generator and divided into two parallel branches, one the battery branch, including the storage battery and the other the translating branch including the translating devices, a rheostat having an electro-magnetic winding for controlling the action thereof, said winding being arranged in the battery branch, and a switch for making said winding independent of the current discharged by the battery whenever the generator and the battery conjointly furnish current to operate the translating devices, said switch being operated by an electro-magnetic winding arranged in the battery branch.

6. In combination, a generator, a storage battery, translating devices, a main circuit extending from said generator and divided into two parallel branches one the battery branch including the battery and the other the translating branch including the translating devices, an automatic switch adapted to close the main circuit when the generator voltage equals that of the storage battery and to open the main circuit when the storage battery sends current backward through the main circuit, a rheostat having an electro-magnetic winding for controlling the action thereof, said winding being arranged in the battery branch, and means for rendering said winding independent of the current discharged by the battery when the battery and the generator conjointly furnish the current to operate the translating devices.

7. In combination, a generator, a storage battery, translating devices, a main circuit extending from said generator and divided into two parallel branches, one the battery branch including the battery and the other the translating branch including the translating devices, a rheostat having an electro-responsive device for controlling the action thereof, said rheostat being arranged in circuit to regulate the generator and said electroresponsive device being arranged in circuit so that its effect is a function of the current the generator sends through the storage battery, and means for rendering said electroresponsive device inert whenever the storage battery and the generator conjointly furnish the current to operate the translating devices.

8. In combination, a generator, a storage battery, translating devices, a main circuit extending from said generator and divided into two parallel branches, one the battery branch including the battery and the other the translating branch including the translating devices, an automatic rheostat having an electro-responsive device for controlling the action, said rheostat being arranged to regulate the generator and said electroresponsive device being arranged in circuit so that its magnetism is proportional to the current the generator sends through the storage battery, and means for rendering said electroresponsive device inert when the storage battery and the generator conjointly furnish current to operate the translating devices.

9. In combination, a generator, a storage battery, translating devices, a main circuit extending from said generator and divided into two parallel branches, one the battery branch including the storage battery and the other the translating branch including the translating devices, an automatic rheostat adapted to regulate the generator to maintain substantially constant current to charge the storage battery at constant speed of the generator said rheostat having an electro-magnetic controlling winding, and means for rendering said winding inert whenever the storage battery and generator conjointly furnish the current to operate the translating devices.

10. In combination, a generator, a storage battery, translating devices, a main circuit extending from said generator and divided into two parallel branches, one the battery branch including the battery and the other the translating branch including the translating devices, an automatic rheostat for regulating the generator to maintain substantially constant current for charging the battery at constant speed of the generator, an automatic switch for controlling the main circuit, and an automatic switch for making the rheostat independent of the current discharged by the storage battery when the generator and the storage battery conjointly furnish the current to operate the translating devices.

11. In combination, a generator, a storage battery, translating devices, a main circuit extending from said generator and divided into two branches, one the battery branch including the battery and the other the translating branch including the translating devices, a rheostat for regulating the generator and having an electro-magnetic winding for controlling the action thereof, said winding being arranged in the battery branch, and means for preventing said winding from being effective when the generator and the storage battery conjointly furnish the current to operate the translating devices.

12. In combination, a generator, a storage battery, translating devices, a main circuit extending from said generator and divided into two parallel branches one the battery branch including the battery and the other the translating branch including the translating devices, a rheostat for regulating the generator, and electro-magnetic winding for controlling said rheostat and arranged in the battery branch, and means for making said winding independent of the current discharged by the storage battery when the generator and the storage battery conjointly furnish current to operate the translating devices.

13. In combination, a generator, a storage battery, translating devices, a main circuit extending from said generator and divided into two parallel branches, one the battery, branch including the battery and the other the translating branch including the translating devices, a rheostat for regulating said generator, an electro-magnetic winding for controlling the action of said rheostat and arranged in the battery branch, and a switch for making said winding independent of the current discharged by said storage battery when the storage battery and the generator conjointly furnish the current to operate the translating devices, said switch being provided with a winding for operating the same arranged in the battery branch.

14. In combination, a generator, a storage battery, translating devices, a main circuit extending from said generator and divided into two parallel branches, one the battery branch including the battery and the other the translating branch including the translating devices, a rheostat for regulating said generator an electro-magnetic winding for controlling the action of said rheostat and arranged in the battery branch, a switch having windings for operating the same arranged in the battery circuit, said switch being adapted to disconnect the first mentioned winding from the battery circuit and connect the translating devices directly to the battery around the first mentioned winding when the generator and the storage battery conjointly furnish current to operate the translating devices.

15. In combination, a generator, a storage battery, translating devices, a main circuit extending from said generator and divided into two parallel branches, one the battery branch including the battery and the other the translating branch, including the translating devices, an automatic switch adapted to close the main circuit when the generator voltage equals that of the storage battery, and to open said main circuit when the storage battery discharges backward through the main circuit, a rheostat for regulating said generator, an electro-magnetic winding for controlling the action of said rheostat and arranged in the battery branch, and means for opening the circuit of said winding when the generator and the storage battery conjointly furnish the current to operate the translating devices.

16. In combination, a shunt field generator, a storage battery, translating devices, a main circuit extending from said generator and divided into two parallel branches, one the battery branch including the storage battery and the other the translating branch including the translating devices, an automatic rheostat for regulating the shunt field strength of said generator, an electro-magnetic winding for controlling the action of said rheostat and arranged in the battery branch and means for making said winding independent of the current discharged by the storage battery when the generator and the storage battery conjointly furnish the current to operate the translating devices.

17. In combination, a generator, a storage battery, translating devices, a main circuit extending from said generator and divided into two parallel branches one the battery branch including the storage battery, and the other the translating branch including the translating devices, an automatic switch adapted to close the main circuit when the generator voltage equals that of the storage battery and to open the main circuit when the storage battery discharges backward through the main circuit, an automatic rheostat arranged to regulate the shunt field strength of the generator, an electro magnetic winding for controlling the action of the rheostat and arranged in the battery branch, and means for making said winding independent of the current discharged by the storage battery when the generator and the storage battery conjointly furnish the current to operate the translating devices.

In witness whereof, I have hereunto subscribed my name in the presence of two witnesses.

WILLIAM L. BLISS.

Witnesses:
 CHARLES B. C. FOWLER,
 EDWIN B. H. TOWER, Jr.